Oct. 28, 1947.  G. E. DATH  2,429,672
RAILWAY CAR END BUFFER SHOCK ABSORBER
Filed Dec. 4, 1944
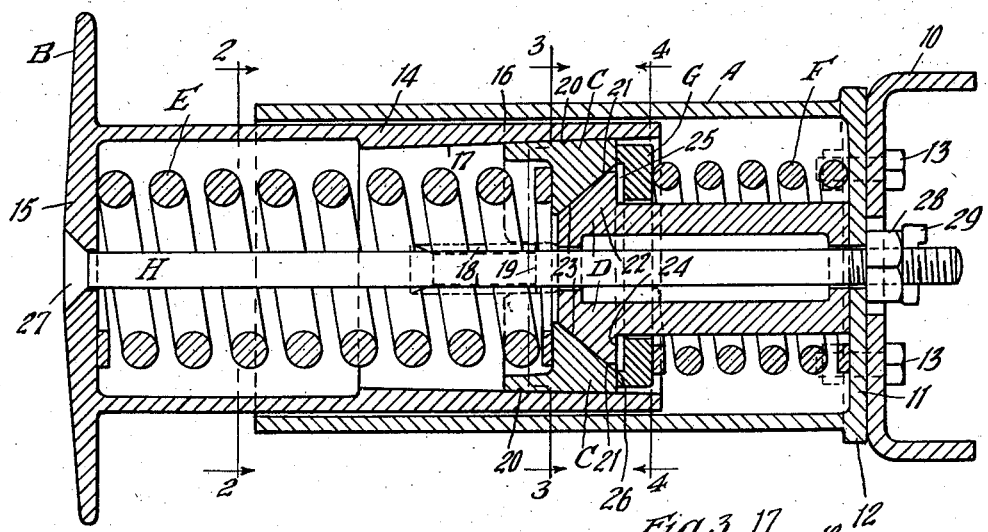
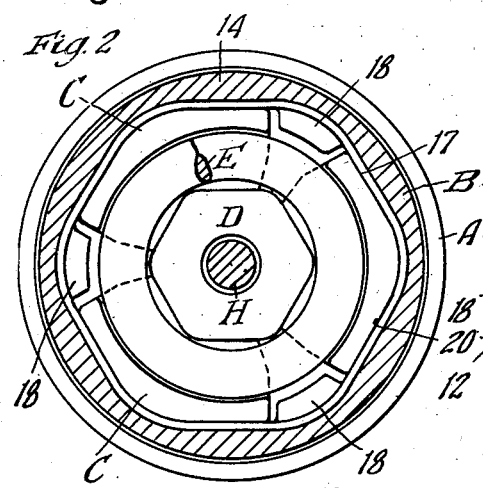
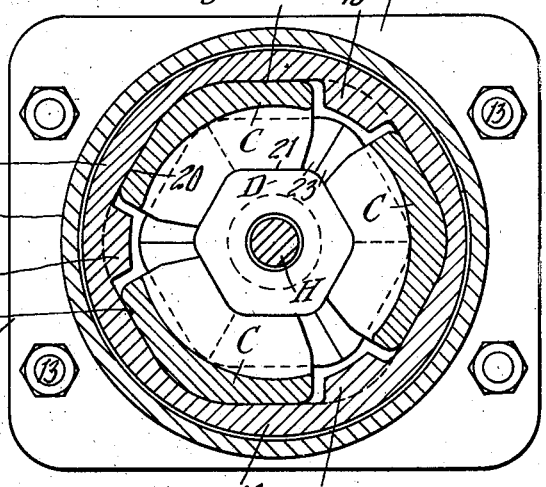
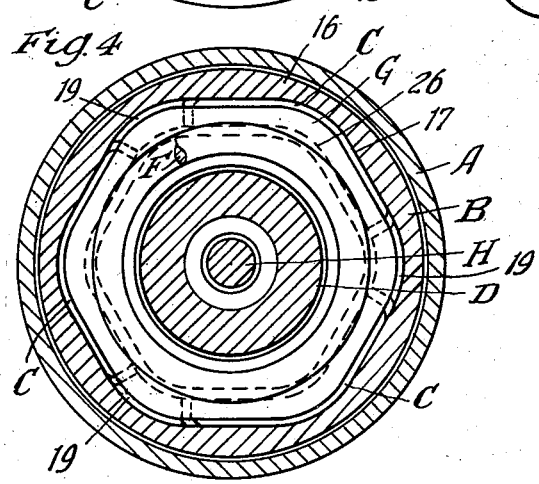
Inventor
George E. Dath
By Henry Fuchs
Atty Patented Oct. 28, 1947

2,429,672

UNITED STATES PATENT OFFICE 2,429,672

RAILWAY CAR END BUFFER SHOCK ABSORBER

George E. Dath, Mokena, Ill., assignor to W. H. Miner, Inc., Chicago, Ill., a corporation of Delaware Application December 4, 1944, Serial No. 566,546

11 Claims. (Cl. 213—221)

1

This invention relates to improvements in shock absorbers for railway cars and more particularly such shock absorbers employed as buffers.

One object of the invention is to provide a shock absorber or buffer mechanism, especially adapted for use in connection with railway cars having initial soft action to absorb the lighter shocks to which the railway car is subjected, followed by high frictional resistance to take care of the heavier shocks, wherein the soft action is produced by, mainly, spring means and the high frictional resistance is produced by relative sliding movement of cooperating friction elements, including a friction clutch which is pressed into frictional contact with the cooperating friction element by the operation of part only of the spring means, and the effective pressure of the clutch on the cooperating friction member is practically eliminated, or at least materially reduced, during said initial action, by counteracting effect of the remainder of said spring means, thereby reducing the frictional resistance to such an extent as to provide, mainly, spring action during this phase of the operation.

A more specific object of the invention is to provide a buffer mechanism comprising a buffer housing secured to the end of the car; a buffer head including a friction casing slidingly telescoped within the housing; a friction clutch within the casing, including friction shoes in frictional contact with the interior walls of the casing, a wedge held against movement with respect to the housing and having wedging engagement with the shoes, and a spring within the casing yieldingly opposing movement of the shoes inwardly thereof and pressing said shoes against the wedge; a spring within the housing opposing movement of the shoes inwardly of the same and counteracting the effect of the first named spring in pressing the shoes against the wedge to produce, mainly, spring action, wherein means is provided, effective after a predetermined compression of the mechanism, for transmitting pressure directly from the buffer head to said second named spring to relieve the friction shoes of the pressure of said second named spring, thus increasing the effectiveness of the first named spring to press the shoes against the wedge and force the same into tight frictional contact with the casing and produce high frictional resistance to absorb the heavier shocks when the mechanism has been compressed beyond said predetermined extent.

Other objects of the invention will more

2 clearly appear from the description and claims hereinafter following.

In the drawing forming a part of this specification, Figure 1 is a longitudinal, vertical sectional view of my improved buffer mechanism, illustrating the same mounted in position on the end of a railway car. Figures 2, 3, and 4 are transverse, vertical sectional views, corresponding respectively to the lines 2—2, 3—3, and 4—4 of Figure 1.

In said drawing, 10 indicates a portion of the end wall of a railway car, the portion illustrated being at one side of the longitudinal center line of the car and having my improved buffer mechanism mounted thereon. As will be understood, the buffer mechanism is duplicated at the other side of the end of the car and the two mechanisms cooperate in a well-known manner with a pair of similar buffer mechanisms on the end of an adjacent car.

My improved buffer mechanism, as shown in the drawing, comprises broadly a housing A; a combined buffer head and friction casing B; three friction shoes C—C—C; a central wedge block D; a spring resistance E; an additional spring resistance F; a follower member G; and a retainer bolt H.

The housing A is in the form of a tubular, cylindrical casing, closed at its rear end by a transverse, vertical wall 11, which is extended laterally outwardly of the housing at opposite sides thereof to provide securing flanges 12—12. The housing A is secured to the end wall of the car by bolts 13—13 extending through suitable openings in the flanges 12—12 and the end wall 10 of the car.

The combined buffer head and friction casing B includes a cylindrical friction casing 14, which is closed at its front end by a transverse wall 15, which extends laterally outwardly beyond the casing to provide the head proper of the buffer head. At the inner end of the casing, which is open, the walls thereof are inwardly thickened, as shown in the drawings, to provide a friction shell section 16 of hexagonal, interior cross section. The friction shell section 16 presents a set of three inwardly or forwardly converging friction surfaces 17—17—17 of V-shaped, transverse cross section. The friction shell section 16 is further provided with three longitudinally extending, relatively short, interior guide ribs 18—18—18, which are alternated with the friction surfaces 17—17—17, being disposed between adjacent of said surfaces. At the forward end thereof, each rib 18 provides a transverse stop shoulder 19, which is spaced inwardly from the open end of the casing and is adapted to cooperate with the follower G to limit inward movement thereof, the stop shoulders of the three ribs 18—18—18 being in transverse alignment.

The friction shoes C—C—C are three in number and each shoe has an outer, longitudinally extending, friction surface 20 of V-shaped, transverse cross section slidingly engaging the corresponding V-shaped friction surface 17 of the casing 14. At the inner side, each shoe C has a wedge face 21 which is of V-shaped, transverse cross section. The wedge faces 21—21—21 of the three shoes converge inwardly of the casing, that is, forwardly of the mechanism.

The wedge D comprises an elongated, hollow post member enlarged at its forward end to provide a head 22 forming the wedge member proper. The head 22 is provided with three forwardly converging wedge faces 23—23—23, which are of V-shaped, transverse cross section and engage with the wedge faces 21—21—21 of the three shoes. At the rear end where the head 22 of the wedge joins the elongated hollow post member thereof, a transverse shoulder or abutment face 24 is provided, which is in transverse alignment with the rear ends of the shoes C—C—C.

The spring E is in the form of a helical coil and is contained within the friction casing 14 of the combined buffer head and friction casing B and has its front and rear ends bearing respectively on the front wall of the casing and the inner ends of the shoes C—C—C.

The spring F is lighter than the spring E and comprises a helical coil, which is disposed within the housing A and has its rear end bearing on the transverse end wall 11 of the housing.

The spring follower G is in the form of a hexagonal, ringlike member, which is interposed between the rear ends of the shoes C—C—C and the front end of the spring F. The spring follower G is cut out, or recessed, at the forward side, as indicated at 25, thereby providing a peripheral, forwardly projecting rib 26 which bears on the shoes C—C—C. The recessed or cut out portion of the follower G provides clearance for the head 22 of the wedge D for a purpose hereinafter described.

The retainer bolt H holds the mechanism assembled and of uniform overall length and the springs E and F under initial compression. The retainer bolt is provided with a head 27 at its forward end, seated in a suitable opening within the wall 15 of the combined buffer head and friction casing B. At its rear end, the bolt is provided with a nut 28, which bears on the outer side of the transverse end wall 11 of the casing A and is held against accidental removal by a key 29.

The operation of my improved buffer mechanism is as follows: Upon the buffer head B being forced inwardly of the housing A by engagement with any object, such as the buffer head of an adjacent car, the spring E is compressed against the shoes C—C—C, movement of which is resisted by the spring F bearing on the spring follower G. Inasmuch as the spring F counteracts or partially balances the action of the spring E, the effective wedging between the wedge D and the shoes C—C—C is materially reduced, or substantially eliminated. The resistance provided during this portion of the compression stroke of the mechanism is thus, mainly, spring action, the friction between the shoes C—C—C and the casing 14 being substantially nil. As heavier shocks are encountered, the mechanism is further compressed until the shoulders 19 of the guide ribs 18 engage the follower G, whereupon the follower is moved rearwardly in unison with the casing 14, thereby compressing the spring F independently of the spring E and relieving the shoes C—C—C from the pressure of the spring F. Wedging action is thus set up between the wedge block D and the shoes C—C—C, thereby forcing the latter into tight frictional contact with the casing 14 as the latter is slid rearwardly with respect to the shoes and taking care of the heavier shocks. Due to the forward taper of the friction shell section 16 of the casing 14, a differential action is set up between the shoes and the wedge block D, causing the shoes to slide forwardly with respect to the wedge. This differential action is taken care of by the cut out portion 25 of the follower G, which provides for the proper clearance. Compression of the mechanism is finally limited by engagement of the front wall 15 of the combined buffer head and friction casing B with the front end of the housing A. When the actuating force is reduced, the springs E and F restore all of the parts to the normal full release position shown in Figure 1, expansion of the mechanism being limited by the retainer bolt H.

I claim:

1. In a shock absorber, the combination with a housing; of a friction casing slidingly telescoped within the housing; friction shoes slidable within the casing; a wedge member held against inward movement with respect to the housing and having wedging engagement with the shoes; a spring yieldingly resisting movement of the shoes inwardly of the casing; a second spring yieldingly resisting movement of the shoes inwardly of the housing; and means movable with the casing for compressing said second named spring against the housing after partial compression of the mechanism, thereby freeing the shoes of the pressure of said second named spring.

2. In a shock absorber, the combination with a housing; of a friction casing slidingly telescoped within the housing; friction shoes slidable within the casing; a wedge member held against inward movement with respect to the housing and having wedging engagement with the shoes; a spring yieldingly resisting movement of the shoes inwardly of the casing; a second spring yieldingly resisting movement of the shoes inwardly of the housing; and means movable with said casing for relieving the shoes of the pressure of said second named spring after partial compression of the mechanism.

3. In a shock absorber mechanism, the combination with a friction casing; of an abutment member, said member and casing being movable toward and away from each other in a direction lengthwise of the mechanism; friction shoes slidingly engaging the interior of the casing; a spring yieldingly resisting relative lengthwise movement of the shoes and casing toward each other; spring means yieldingly resisting movement of said shoes and abutment member lengthwise toward each other; a spring follower interposed between said last named spring means and shoes for transmitting the pressure of said spring means to the shoes; a wedge having wedging engagement with the shoes and abutting said abutment member; and abutment means on said casing engageable with said spring follower after partial compression of the mechanism to arrest lengthwise movement of said spring follower with respect to the casing.

4. In a shock absorber mechanism, the combination with a front friction casing closed at its front end and having interior friction surfaces at its rear end; of a rear abutment member, said abutment member and casing being movable toward and away from each other lengthwise of the mechanism; friction shoes within the casing slidingly engaging the friction surfaces thereof; a spring within the casing bearing at its front and rear ends respectively on the closed end of the casing and the front ends of said shoes; a follower element bearing on the rear ends of the shoes; a second spring interposed between the follower and said abutment member and bearing at its front and rear ends respectively on the follower element and said abutment member; a wedge buttressed against said abutment member and in wedging engagement with the shoes; and abutments on said casing engageable with said follower after partial compression of the mechanism to force said follower toward said abutment member and away from said shoes.

5. In a shock absorber, the combination with a housing closed at one end and open at the other end; of a friction casing closed at one end and open at the other end, said open end of the casing being slidingly telescoped within the open end of the housing; friction shoes within the casing in lengthwise sliding engagement with the interior walls thereof; a wedge member within the housing buttressed against the closed end thereof, said wedge member having wedging engagement with the shoes; a spring within the casing yieldingly opposing movement of the shoes, said spring bearing at opposite ends respectively on the closed end of said casing and the inner ends of said shoes; a spring follower bearing on the outer ends of the shoes; a spring within the housing bearing at opposite ends on the follower and the closed end of the housing; and abutments on the interior of the casing engageable with said spring follower after partial compression of the mechanism to relieve the shoes of the pressure of said second named spring.

6. In a shock absorber, the combination with a housing fixed to the end of a car, said housing being open at its front end and closed at its rear end by a transverse wall; of a friction casing slidingly telescoped within the housing, said casing being closed at its front end by a transverse wall and open at its rear end, said open rear end having interior friction surfaces extending lengthwise of the casing; friction shoes within the casing in sliding engagement with the friction surfaces thereof; a wedge member within the housing buttressed against said transverse wall thereof and having wedging engagement at its front end with the shoes; a spring follower bearing on the rear ends of the shoes; a coil spring within said casing bearing at its front and rear ends respectively on the transverse wall of the casing and the front ends of the shoes; a coil spring member within said housing bearing at its front and rear ends respectively on the spring follower and the transverse wall of the housing; and abutment shoulders on the interior of the casing engageable with said spring follower after partial compression of the mechanism to move said follower in unison with the casing inwardly of the housing.

7. In a shock absorber mechanism, the combination with a housing fixed to the end of a car, said housing being open at its front end and closed at its rear end by a transverse wall; of a friction casing slidingly telescoped within the housing, said casing being open at its rear end and closed at its front end by a transverse wall, said open end having interior, forwardly and inwardly converging friction surfaces extending lengthwise of the casing; friction shoes slidingly engaging the friction surfaces of the casing; a wedge block in wedging engagement with the rear ends of the shoes, said wedge block having a rearwardly extending stem buttressed against said transverse wall of the housing; a spring follower surrounding said stem and normally spaced rearwardly of the wedge block, said follower having a forward projection clearing the wedge and bearing on the inner ends of the shoes; a spring bearing at its front and rear ends respectively on said transverse wall of the casing and the front ends of the shoes; a second spring surrounding said stem of the wedge and bearing at its front end on the spring follower and at its rear end on the transverse wall of the housing; and interior guide ribs on the casing engaging between adjacent shoes and presenting stop shoulders at their rear ends spaced forwardly from the rear end of the casing and engageable with said follower after partial compression of the mechanism.

8. In a shock absorber, the combination with an abutment member; of a friction element, said element and member being relatively movable toward and away from each other lengthwise of the mechanism, said element having a lengthwise extending friction surface; a friction shoe having lengthwise sliding engagement with the friction surface of said friction element; a wedge member having wedging engagement with said shoe to force the same against said friction surface; a spring reacting between the friction element and shoe yieldingly opposing movement of said friction element lengthwise with respect to said shoe toward said abutment member; a second spring reacting between said shoe and said abutment member yieldingly opposing movement of said shoe toward said abutment member; and means movable with said friction element for compressing said second named spring against said abutment member after a partial compression of the mechanism, thereby freeing the shoe of the pressure of said second named spring.

9. In a shock absorber, the combination with a rear abutment member; of a friction element, said element having a spring abutment at the front end thereof and a lengthwise extending friction surface at the rear end portion thereof, said element and abutment member being relatively movable toward and away from each other lengthwise of the mechanism; a friction shoe engaging the friction surface of said element, said element having lengthwise sliding engagement with the shoe; a wedge buttressed against said rear abutment member and having wedging engagement with said shoe; a front spring having its front and rear ends bearing respectively on said spring abutment and the front end of said shoe; a rear spring having its front and rear ends buttressed respectively against said shoe and rear abutment member; and means movable with said friction element for compressing said rear spring against said abutment member after partial compression of the mechanism, thereby freeing said shoe of the pressure of said spring.

10. In a shock absorbing mechanism, the combination with an abutment member at one end of the mechanism; of a friction element at the other end of the mechanism, said element having a spring abutment at the outer end thereof and a lengthwise extending friction surface at the inner end, said element and abutment member being relatively movable toward and away from each other lengthwise of the mechanism; a spring at said first named end of the mechanism having its outer end bearing on said abutment member; a second spring at said second named end of the mechanism having its outer end bearing on said spring abutment of the friction element; a friction shoe interposed between said springs at the inner ends thereof, said shoe having its opposite ends bearing on the inner ends of said springs respectively, said shoe engaging the friction surfaces of said element and said element having lengthwise sliding engagement with said shoe; a wedge buttressed against said abutment member and having wedging engagement with said shoe; and means movable with said friction element for compressing said second named spring against said abutment member for partial compression of the mechanism, thereby freeing said shoe of the pressure of said first named spring.

11. In a shock absorbing mechanism, the combination with an abutment member at one end of the mechanism; of a friction element at the other end of the mechanism, said element having a spring abutment at the outer end thereof and a lengthwise extending friction surface at the inner end, said element and abutment member being relatively movable toward and away from each other lengthwise of the mechanism; a spring at said first named end of the mechanism having its outer end bearing on said abutment member; a second spring at said second named end of the mechanism having its outer end bearing on said spring abutment of the friction element; a friction shoe interposed between said springs at the inner ends thereof, said shoe engaging the friction surface of said element and said element having lengthwise sliding engagement with said shoe; a spring follower interposed between said shoe and the inner end of said first named spring, said spring follower bearing on the corresponding end of said shoe and said inner end of said first named spring, said shoe having its outer end bearing on said inner end of said second named spring; a wedge buttressed against said abutment member and having wedging engagement with said shoe; and a shoulder on said friction element engageable with said spring follower after a predetermined movement of said friction element toward said abutment member to move said spring follower toward said abutment member in unison with the friction element and compress said first named spring against said abutment member, and thereby free said shoe of the pressure of said first named spring.

GEORGE E. DATH.

REFERENCES CITED

The following references are of record in the file of this patent:

UNITED STATES PATENTS

| Number | Name | Date |
| --- | --- | --- |
| 1,872,881 | Brooks et al. | Aug. 23, 1932 |